US008356324B2

(12) United States Patent
Rajakarunanayake

(10) Patent No.: US 8,356,324 B2
(45) Date of Patent: Jan. 15, 2013

(54) IMPLEMENTING NETWORK PERSONAL VIDEO RECORDER FOR DIGITAL VIDEO SETTOP BOXES

(75) Inventor: Yasantha Nirmal Rajakarunanayake, San Ramon, CA (US)

(73) Assignee: Broadcom Corporation, Irvine, CA (US)

( * ) Notice: Subject to any disclaimer, the term of this patent is extended or adjusted under 35 U.S.C. 154(b) by 1431 days.

(21) Appl. No.: 11/859,571

(22) Filed: Sep. 21, 2007

(65) Prior Publication Data
US 2009/0080864 A1 Mar. 26, 2009

(51) Int. Cl.
*H04N 7/173* (2011.01)
(52) U.S. Cl. ............. 725/88; 725/93; 725/116; 709/219
(58) Field of Classification Search ............ 725/86–116; 709/217–231
See application file for complete search history.

(56) References Cited

U.S. PATENT DOCUMENTS

| 5,873,022 A * | 2/1999 | Huizer et al. ................. 725/100 |
| 6,065,050 A * | 5/2000 | DeMoney ..................... 709/219 |
| 6,480,667 B1 * | 11/2002 | O'Connor ..................... 386/326 |
| 6,751,802 B1 * | 6/2004 | Huizer et al. ................... 725/90 |
| 6,973,621 B2 * | 12/2005 | Sie et al. ....................... 715/720 |
| 7,440,674 B2 * | 10/2008 | Plotnick et al. ............... 386/343 |
| 2006/0161742 A1 * | 7/2006 | Sugimoto et al. ............. 711/154 |

* cited by examiner

*Primary Examiner* — Annan Shang
(74) *Attorney, Agent, or Firm* — Brake Hughes Bellermann LLP

(57) ABSTRACT

A video program is streamed in a normal mode to a digital media rendering system on a first connection to the rendering system. Then, while streaming the video program over the first connection, a control signal is received from the rendering system over a second connection with the rendering system. In response to receipt of the control signal, the normal mode of streaming the video program is switched to a trick mode of streaming the video program over the first connection. This is done without closing the first connection. In response to receipt of the control signal, a resynchronization signal is sent to the rendering system over the first connection. The resynchronization signal causes the rendering system to resynchronize the processing of video program data packets after the trick mode of streaming has begun.

22 Claims, 4 Drawing Sheets

IMPLEMENTING NETWORK PERSONAL VIDEO RECORDER FOR DIGITAL VIDEO SETTOP BOXES

This description relates to playing back digital media data over a network from one network device to another and, in particular, to a method and apparatus for implementing network personal video recording (PVR) operations for digital video settop boxes over a network transfer protocol, such as, for example, hypertext transfer protocol (HTTP).

BACKGROUND

As Internet based broadband systems have become widely deployed, the display of high-quality streaming media (e.g., television signals) delivered through Internet protocol ("IP") based networks has been contemplated. Many vendors seek both to display media as well as to stream digital media in various customer premises, including digitally connected homes. However, because of the high bandwidth and processing power required to deliver and display digital video, it is quite challenging to provide high quality IP-based television ("IPTV") functionality using traditional settop box ("STB") capabilities.

Moreover, homes can be equipped with multiple STBs, personal computers (PC's), and video gaming consoles, etc. to provide for the rendering of video programs at multiple locations within the home, which can complicate the storage and rendering of digital data across a network connecting devices at the different locations. A particular problem is the difficultly in handling so called "trick modes" of playing back digital data over a network (e.g., fast forwarding, playing in reverse, and skipping forward or backward). Playing back digital data received over a network by a client from a server in a trick mode can require either the client processing the data at a different speed than when in normal playback mode or the server sending different data to the client when in trick mode than when in normal playback mode. For example, when a user of the client wishes to view the digital data in a fast forward (FF) mode at eight times the normal playback speed the server may send only every eighth video frame of the digital data that makes up a program, so that the client may render every eighth frame of the program at a rate that is normally used to render every frame of the program when the program is displayed in a normal mode. In this manner the viewer can experience the program at a rate that is eight times faster than normal playback speed. However, when switching from normal playback mode to a trick mode, the viewer may experience a relatively long delay when a network session between the client and the server for normal playback is interrupted and a new trick mode session is established. This long delay may diminish the viewer's experience of the program.

SUMMARY

The details of one or more implementations of systems and methods for implementing network personal video recording (PVR) operations for digital video settop boxes over a network transfer protocol are set forth in the accompanying drawings and the description below. Other features will be apparent from the description and drawings, and from the claims.

DETAILED DESCRIPTION

Figure 1:
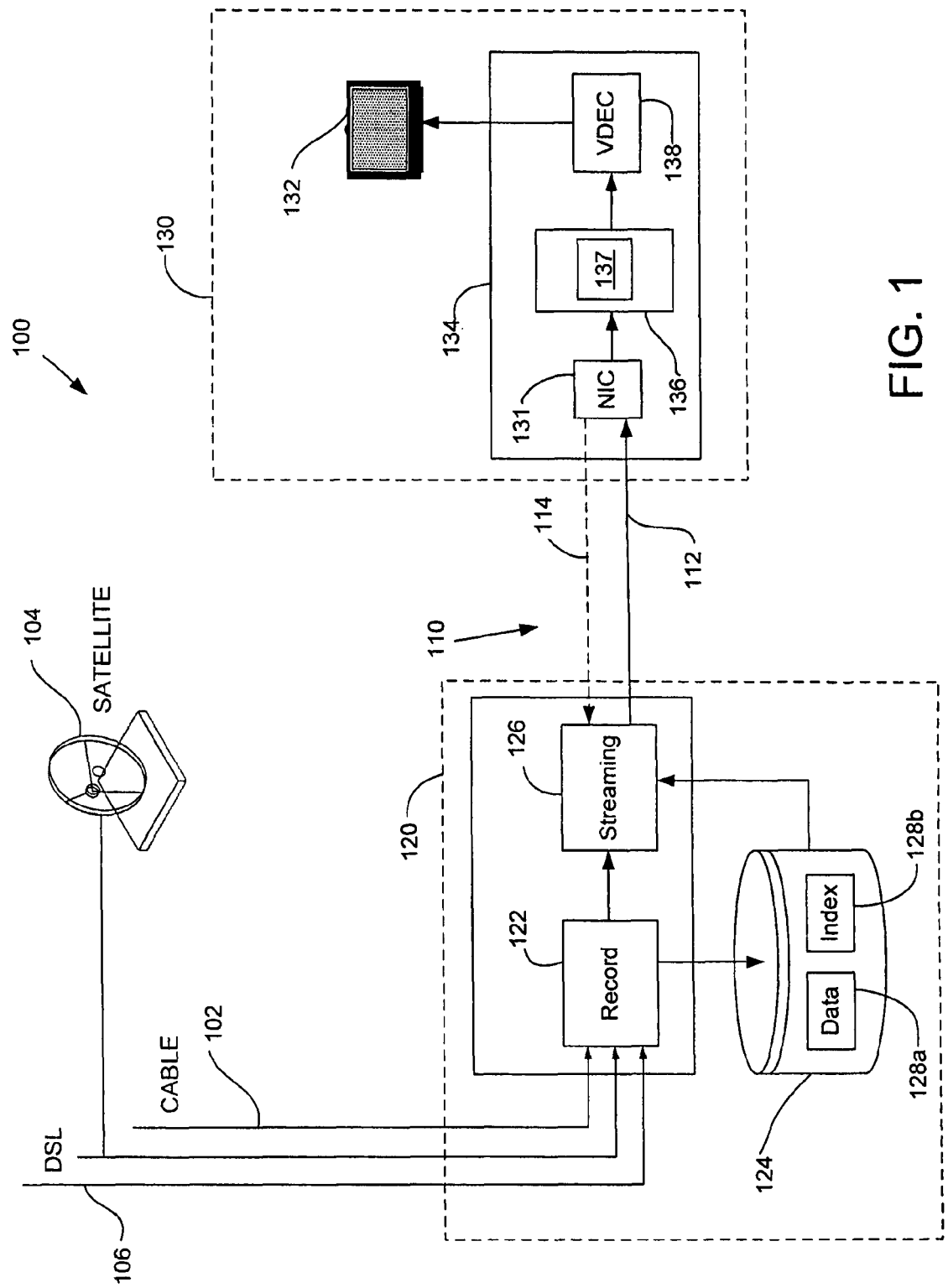
FIG. 1 is a block diagram of a system that includes a network over which video programs stored on a digital media server can be streamed to a digital media renderer for play back and that can switch between a normal playback mode and a trick mode according to instructions sent from the client to the server.

As described herein, systems and methods are disclosed to control and change the speed and/or direction of a media content stream (e.g., a video program) that is streamed from a media server to a media renderer, while data is being streamed. A controlling channel between the server and the renderer, which is logically distinct from the main data transport channel, can be used to send control signal events from the renderer to the server and to put the server into different trick modes of streaming on the server that require that video frames are skipped or repeated etc, or streamed in reverse for rewind operations. In addition, feedback can be provided from the rendering client to the server about the position or timestamp in the stream that the server shall seek during a trick-mode change for smooth, continuous operation. Additionally, packets that are in-flight packets between the server and the client can be flushed and discarded at trick mode transitions to cope with packet data that is buffered at the server, in-flight from the server to the client, or buffered at the client when the trick mode control signal is sent. Furthermore, stringent requirements can be imposed on the server for the timely delivery of video frames based on the nature of embedded timestamps of the media content stream and the particular trick-mode.

A separate control socket (e.g., a network data connection) from the standard data flow/download socket can be used for communicating PVR control events from the client to the server to reduce latency of trick mode transitions and to provide "out-of-band" control of the streaming process along with special capabilities for data packet insertion for flushing. Thus, two HTTP sessions can be used between the server and the client—one persistent connection for data download and another connection for communicating PVR control events from the client to the server. For example, the data connection 112 can use port 80 for its HTTP session, while control connection 114 can use port 81 for its HTTP session. These services can be configured on separate transmission control protocol (TCP) ports or can be bound to separate uniform resource locators (URL) at the server.

Thus, the implementation of trick mode renderings can be controlled at the server-side, and the client (e.g., a digital media renderer (DMR)) need not have detailed knowledge about frame positions, index files, etc. related to the media file stored on the server, but only sends specific events to the server to signal trick-mode transitions. Server-side trick mode rendering can be advantageous over the client-side trick mode rendering because the server is well aware of the video formats, and because the client need not know about the frame structure of the video content stream the client device is only required to decode frames sent by the server and be able to toggle between a normal V-sync mode of operation (i.e., when the timing of the display of individual video frames is controlled by the V-sync pulses in the content stream and the content is displayed at a normal speed) and a "trick mode" of operation (i.e., a time-stamp enabled mode of operation) where the decoding and display of video frames is based on embedded timestamps in the media content. The server-side mode of implementing trick modes generally results in smoother user experience, reduced upstream network traffic, and eliminates latency issues associated with client-side trick mode rendering that can result in a "slideshow effect" that can be problematic for a user.

FIG. 1 is a block diagram of a system 100 that includes a network 110 over which video programs stored on a digital media server (DMS) 120 can be streamed to a digital media renderer (DMR) 130 for play back and that can switch between a normal playback mode and a trick mode according to instructions sent from the client to the server. In one implementation, a video program, for example, a digital audiovideo broadcast carrying digital media data, can be received from one or more broadcasters that broadcast signals that encode audiovideo programs. For example, a broadaster may broadcast signals that encode one or more video programs for playback to a viewer. Although the broadcast, reception, and playback of all types of digital video and audiovideo programming via digital media data is contemplated, here we focus on the audiovideo video programming, merely for clarity.

In one example implementation, the DMS 120 and the DMR may be connected via a local area network 110, such that the DMS and the DMR are relatively close together (e.g., DMS and the DMR may both be located within a user's home). In such an example implementation, an affiliate of a television network (e.g., ABC, NBC, CBS, FOX) can broadcast a video program on a very high frequency (VHF) channel or on an ultra high frequency (UHF) channel, and the broadcast can be received by the DMS 120 and stored for later playback by the DMR 130 or for instant streaming to the DMR 130. A video broadcaster also can broadcast multiple signals for encoding multiple television programs. For example, a cable television provider can broadcast multiple video programs over a cable 102 that is routed to the DMS 120, so that one or more programs can be selected from the broadcast for recording on a device 124 connected to the DMS 120 and/or for streaming out to the DMR 130 for playback. Other broadcast mechanisms are also possible. For example, multiple video programs can be broadcast over a satellite connection 104. In another example, multiple video programs can be broadcast over a high-speed Internet connection (e.g., a digital subscriber line (DSL) connection 106). In another example, the video program can be received from an online media source (e.g., Google.com, Yahoo.com, YouTube.com, ABC.com, MLB.com) over the Internet connection 106. Thus, the video program can be received from a variety of signal sources using a variety of media, including, for example, a satellite dish, a coaxial, cable, a telephone line (including DSL connections), a broadband over power line connection, an IP Network, or a VHF or UHF antenna.

When a video broadcast is received at the DMS 120, a video program carried by the broadcast signal can be selected from the broadcast by a de-multiplexing and recording application 122 and routed to a storage device 124 for storage. The selected program also can be streamed out of the DMS 120 through a streaming process 126 to the DMR 130 for display on a video display device 132. Generally, the DMS 120 routes video programs and digital signals that encode the video program. If the video broadcast is an analog broadcast (e.g., a VHF or UHF broadcast), an analog to digital converter in the DMS 120 can convert the incoming analog signal into an outgoing digital signal. The digital signals can be encoded and compressed before transmission and storage in the storage device 124. The video display device 132 can be any display device for rendering a video program to a viewer, for example, a traditional cathode ray tube (CRT) based television set, a flat panel plasma display device, or liquid crystal display (LCD) based device. The display device normally associated with a personal computer (e.g., a computer monitor) can also be used as a television display device. The recording application 122 of the DMS 120 can include electronic tuner circuitry adapted for demultiplexing a video program from the video broadcast received by the DMS 120, so that the program can be rendered on the display device 132 associated with the DMR 130.

The DMS 120 can be a settop box (STB) such as a STB that is integrated with a display device (e.g., in the case of a "cable ready" television set, or DTV), or a STB that is independent of a display device. For example, special external digital STB's can receive a digital video broadcast and decode the broadcast for a television set that does not have a built-in digital tuner. In the case of direct broadcast satellite (minidish) systems, such as those offered by SES Astra, Dish Network, and DirecTV, the DMS 120 can include a STB having an integrated receiver/decoder.

The DMS 120 can be connected though the digital network 110 to one or more DMR's 130 that play back video programs streamed from the DMS 120. For example, in one implementation, the DMR 130 can include another settop box 134 connected to a display device 132 that receives the video program and plays back the program. The network connection 110 can be a wired network connection or a wireless network connection. For example, a wired network connection can be an Ethernet network through which the DMS 120 can communicate with the DMR 130, and a wireless network connection can be an 802.11 wireless network through which a DMS 120 can communicate with the DMR 130. The network 110 can exist, for example, within the home of a subscriber of various video programs. Thus, in some implementations, the subscriber may have multiple DMR's 130 positioned in different locations within the home, each of which is connected via the network 110 to the DMS 120. In one implementation, one or more DMR's 130 in the subscriber's home can be connected to a single DMS 120 that can be used to store video programs for later playback. In such an implementation, each DMR 130 connected to the DMS 120 need not include a permanent storage device for storing video programs. Rather, these "edge devices" can be equipped with circuitry for decoding video programs signals for playback on the display device 132 and can be built more economically than a DMR that must include a local permanent storage device for storing programs for timeshifted playback.

In another implementation, the network 110 can be a wide area network, and the DMS 120 and the DMR 130 can be located quite remotely from each other. For example, the DMS 120 can be part of an online server associated with a website that service digital video data content over the Internet to a user for display on a DMR 130. Thus, the network 110 can be either a local area network (e.g., a home LAN or a corporate LAN) or a wide area network (e.g., the Internet a wireless WAN or a wired WAN).

As shown in FIG. 1 the DMS 120 can include a recording process 122 for recording digital media content onto a storage device 124 (e.g., a hard disk, an optical disk, or a flash memory device) and can include a streaming process 126 for streaming media from the hard disk 124 to the DMR 130 over the network 110. The network 110 between the DMS 120 and the DMR 130 has a bandwidth and capacity that is generally higher than the required bandwidth for playing smooth, continuous video, and trick modes on the DMR 130. In usual operation, the faster trick modes can sometimes consume a higher bandwidth than the normal encoded bit-rate of the streamed video. For example, for rendering high quality MPEG-2 HD trick modes, bandwidths in-excess of 40 megabits per second (Mbps) may be required. However, with the advent of higher bandwidth cable modems, and VDSL, it is possible to operate the DMS 120 at a central office and stream the video program over a wide area network to a DMR 130 at the premise of a customer.

The network 110 connecting the DMS 120 and the DMR 130 can include a downstream connection 112 for video program data, while an upstream control connection 114 is shown with a dashed line. The DMR can include a network interface controller (NIC) 131 adapted to interface with the network 110 and to receive video program data from the DMS 120. A client application 136 can receive video data from the NIC 131 and forward the data to a video decoder 138, and the client application can also send upstream PVR control data to the server 120 on the control connection 114. The video decoder 138 then can decode the compressed video program data and render the video on the display device 132.

By using separate control sockets for streaming video data 112 and for controlling trick mode transition events 114 to implement server-side trick-mode the latency normally associated with creating new TCP connections for trick-mode transitions can be avoided. By using an out-of band quick communication over the control connection 114 from the application 136 running on the DMR 130 to the streaming process 126 running on the DMS 120 the streaming and rendering of the video program can be switched from normal rendering to trick mode rendering server process very quickly, e.g., within a fraction of a frame time or less. No slowdown in the data throughput is necessary because the underlying transmission control protocol/internet protocol (TCP/IP) layer is not slowed down. Therefore, the data pump can continue at normal speed of multi Mbps through the transition from normal playback to trick mode playback.

Additionally, the control connection 114 can carry either discrete event requests to a PVR event listening service running on the DMS 120 or keepalive signals can be sent over the connection 114 to ensure that the connection 114 remains operational during the corresponding streaming video session over the data connection 112. Because the control socket 114 is distinct from the data session 112, it can optionally or periodically provide client-side feedback information to the server 120, so that the server 120 can maintain state information about the client 130. This can be done every few seconds or so, and can provide mechanisms for the server 120 to update out of band data such as media duration changes, etc. back to the client as well. This metadata can allow the client 130 to draw correct status bars, etc., and provide correct visual information to users via out of band graphical user interface (GUI) layer application logic.

To manage the control signals two specially formatted and crafted network packets, a network flush packet (NFP) and network data resync packet (NRP), generated by a control signal generation engine 137, can be used. When a trick mode change is requested by the client 130, the client can flush (i.e., discard) all remaining video data buffered on the client side. This can be done by sending a NFP to the client-side decoder 138 from the client's controlling application 136. In addition, the client 130 can flush all data packets that are en route to it from the server 120 until the first data packet from the new PVR mode (i.e., the trick mode, if the client had signaled the server to switch from normal mode to trick mode playback) is received. The NRP can be a prepended special binary audio-visual packet (e.g., an MPEG transport packet, or minimum length frame which has special meaning), to signal the decoder 138 that a data packet from the new PVR session (e.g., the trick mode session, if the playback had previously been in normal mode) has arrived and that decoding can resync and resume.

Alternatively, a flush operation on the client 130 can be achieved by a special command and control sequence that directly programs the video decoder 138 to discard all packets until a special packet NRP is received by the client. The application 136 then may not require a NFP, as this special command and control sequence achieves the same purpose.

In contrast, the server 120 can send an indication that the new data being sent from the server 120 belongs to the new PVR mode that was ordered by the client 130. This can be achieved via a NRP (network resync/resume packet) sent from the server 120 to the client 130. The client-side may respond to the NRP from the sever in several different ways. For example, the client application 136 can pass the NRP directly on to the decoder firmware, which will resume video decoding in the new mode. The NRP may optionally contain information about various decoder mode settings etc., so that the operation of the decoder switching between normal and trick modes can be controlled by information embedded in the NRP. In another implementation, the client-side application 136 may simply intercept this NRP packet and provide the proper application level control hooks to forward data to the decoder only after the NRP is received and all data between the NFP and the NRP are discarded, although the packets that are received between the NFP and NRP instances should be acknowledged back to the server 120 if using a TCPIP protocol to keep the protocol alive.

Thus, control of server-side normal mode/trick mode playback transitions can be managed through use of the Network Flush Packet and the Network Resynchronization Packet. The Network Flush Packet (NFP) can be issued to the client-side decoder 138, in-line with the packet flow of the media content data streaming from the server 120. This NFP packet can serve to notify the decoder 138 or a client-side packet filter to drop all packets until a corresponding NRP is received. The Network Resync Packet (NRP) can be transmitted from the server 120 to the client 130 at the beginning of every PVR state transition (i.e., a transition between a normal mode and a trick mode) and can serve to notify the decoder 138 on the client-side to accept all data packets after this NRP packet, and resume rendering of video data on the display device 132.

When the video data is streamed from the server 120 to the client 130 the streaming engine 126 running on the server 120 can make use of an index file 128b that has pre-classified information about the group of picture (GOP) structure of the video program stored in the data file 128a on the storage device 124 and a set of timestamps, which can be used for streaming. The information about the GOP structure and the timestamp information can be generated while recording the video program to the storage device, or even while streaming the video program to the client simultaneously as the program is received by the server if hardware stream parsers are used. An indexer used to generate the index data 128b can be a pure software object that operates in different modes (e.g., for each trick mode and/or in normal playback mode) and can provide metadata about the successive chunks of the video program file to be streamed (e.g. Frame type, timestamp, file position, and file offset).

Figure 2:
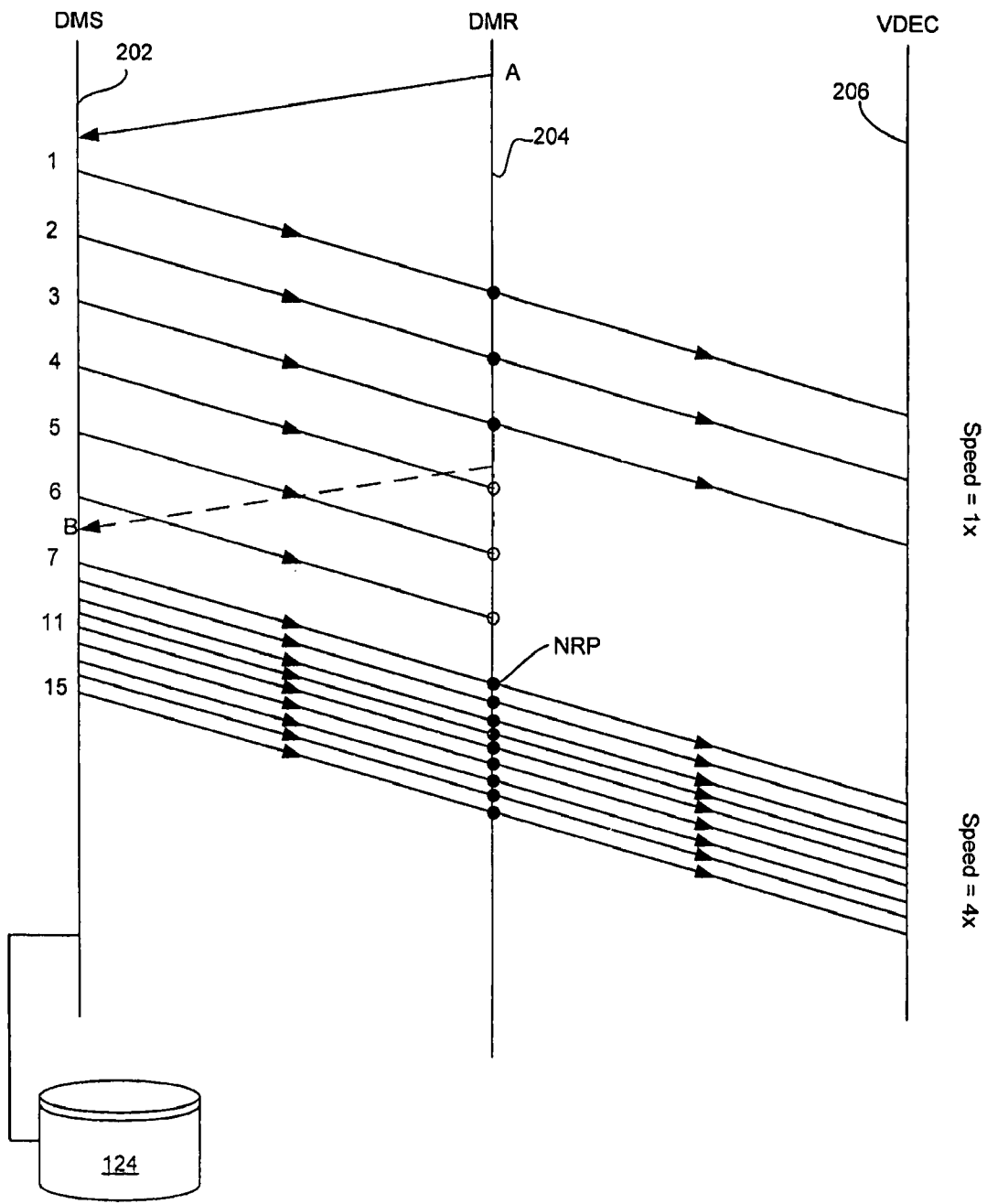
FIG. 2 is schematic timeline of an event progression in the streaming of video data from a server to a client during which the client instructs the server to switch from a normal playback mode to a trick mode.

FIG. 2 is schematic timeline of an event progression in the streaming of video data from a server to a client during which the client instructs the server to switch from a normal play back mode to a trick mode. In particular, FIG. 2 illustrates the flow of signal events and video packet flow between the DMS 120 and the DMR 130 in a PVR transition between a normal mode and a trick mode. A vertical timeline 202 at the left of FIG. 2 shows a numbered sequence of packets at times when the packets originate or are received at the server DMS 120. Time flows down the vertical axis (i.e., higher numbered packets shown lower on the line 202 originate later than lower numbered packets shown higher on the line 202). A vertical timeline 204 in the middle of FIG. 2 shows a numbered sequence of packets at times when the packets originate or are received at the client DMR 130. A vertical timeline 206 at the right of FIG. 2 shows a numbered sequence of packets at times when the packets are received at the client video decoder 138.

An initial event, A, starts the flow of packets numbered 1, 2, and 3 from the DMS 120 server to the client 130. For example the event, A, can be triggered by the DMR 130 sending a request to the DMS 120 to stream a video program for the server to the client and the event can correspond to the beginning of a network session between the DMR 130 for streaming the video program data over the connection 112. After the event A occurs at the server 120 and streaming of video program data begins in a normal mode, the packets 1, 2, 3 are played out at 1× (i.e., normal) speed and forwarded to the client-side decoder 138.

Next, another event (e.g., event B) can be received at the server to indicate that the server should enter a trick mode of streaming video data to the client 130. For example, the event B can correspond to the arrival of a communication from the client 130 to the server over the control socket 114, where the communication includes a message commanding the server to enter a trick mode of operation. Before the server received event B, packets 4, 5, and 6 had been streamed out of the server and were in transit to the client 130, even though packets 4, 5, and 6 were sent after the DMR 130 sent out the message corresponding to event B. Therefore, packets 4, 5, and 6, and any packets that arrive at the DMR 130 after the DMR has sent the event B and before the DMR receive a NRP, can be dropped by a client-side filtering process (e.g., running as part of the application 136) that intercepts video data packets when they arrive from the server. Alternatively, a NFP could be sent by the client application 136 to the decoder 138 to tell the decoder to drop all packets received after the NFP until a NRP is received by the decoder. Then, the first packet sent from the DMS 120 after the DSM receives event B (e.g., packet 7) and enters the trick mode of operation can include a NRP that indicates that subsequent packets, and NRP itself, should be forwarded to and processed by the decoder 138. After the decoder receives the NRP, the decoding process resumes, and packets 7, 8, 9 are played out to the display device according to the trick mode of operation (e.g., at 4× speed in the example of FIG. 2).

At the DMS 120, when PVR events are received, the two threads servicing the data flow (i.e., the Streaming Thread on the data connection 112), and the control thread (PVR Control or PVR Event Thread on the control connection 114) can be synchronized, via a semaphore mechanism. If multiple clients 130 are connected to the server 120, a filter rule matching can be performed based on the IP address, Port numbers, Protocols etc. of the clients, so that a PVR message received from a client is dispatched to the correct server streaming thread. These processes are described in more detail with reference to FIG. 3.

Figure 3:
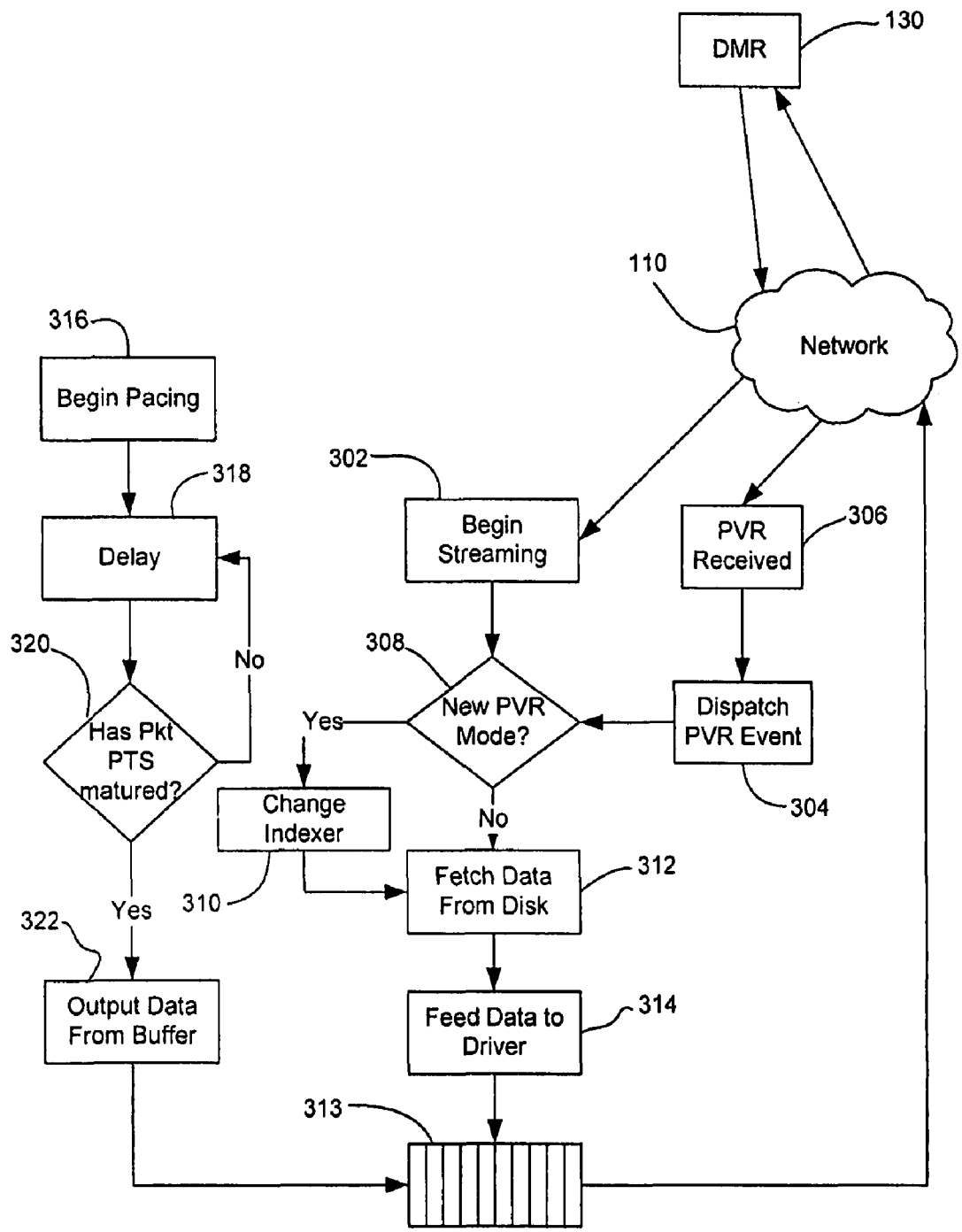
FIG. 3 is a flow diagram illustrating server control processes for streaming video data to a client for rendering on a display device in response to client commands to switch between normal and trick modes of operation.

FIG. 3 is a flow diagram illustrating server control processes for streaming video data to a client for rendering on a display device in response to client commands to switch between normal and trick modes of operation. The DMR 130 can send commands through the network 110 to the server to initiate network playback or PVR requests. For example, the server can receive a request 302 to begin streaming video program data from the server to the client over the network, and this request can cause the server to begin streaming. To establish a network session for streaming a video program, a client can send an HTTP GET request to the server, and the server can respond to the client with a HTTP Response, followed by binary data on the same connection. The HTTP GET request can be for a simple video program identified by a uniform resource identifier (URI) on the server. Optionally, the client can initially identify preferences such as an initial skip duration.

Once the video program is being streamed to the client, a PVR event server 304 running on the server 120 can listen for PVR control events sent from the DMR 130 and when a PVR event 306 is received the PVR server 304 can dispatch the event to the streaming engine 126 for processing, such that the PVR event is synchronized with the streaming thread that streams the video data program out of the streaming engine 126 across the data connection 112. At the end of sending each video frame the streaming engine can check whether the PVR mode has changed (step 308). If it has changed, then a new indexer mode is chosen (step 310). Once the proper indexer has been selected, then, based on the indexer, data can be read from the storage device (step 312) and then fed to a buffer (e.g., a FIFO buffer 313) (step 314). The streamer driver paces according to a programmable clock reference (PCR) of the buffer and sends the video program data (in a packetized format with appropriate network header information) over the network 110 to the DMR 130.

When a PVR event is received by the server (step 306), it will immediately change the indexer mode and flush all remaining data from the server-side buffers (e.g., the FIFO buffer 313). In addition, the server 120 will send out a network-resync packet (NRP) and will send the video program data according to the new mode. The NRP can be meaningful to the DMR application 136 that receives the video program data, or the NRP packet can be passed on to the video decoder 138. If the decoder firmware is enhanced to recognize a particular format used for a NRP, then the decoder itself can be programmed to discard all data fed until a network resume packet (NRP) is fed to the decoder. It is assumed that an index file 128b is available that corresponds to the data file 128a to be streamed, where the index file can be a metadata file that tabulates various picture types in the video stream and the relative timestamps for presentation, also known as presentation time stamps (PTS).

During trick modes video frames are extracted from the data file 128a for streaming to, and playback on, the DMR 120. Various data formats of video data and multiple encapsulation layers may exist. However, if the data is not encrypted on disk it is possible to parse the video files and extract the timestamps, frame sizes, frame types, and other structural inter relationships that exist in video data. The computing overhead to index the entire file on the fly, using software and CPU resources is usually quite high, and other hardware assist mechanisms are usually employed. However, in one implementation, described in U.S. patent application Ser. No. 11/828,770, filed Jul. 6, 2007, and entitled, "Method and Apparatus for Synchronized Transmission and Reception of Audiovisual Data and Index Data in Internet Protocol Television Applications for Implementing Remote Network Record with Instant Personal Video Recorder Support," which is incorporated herein by reference, an index can be generated from the data at record time or at playback time. The existence of an index file 128b corresponding to every piece of streamable content, which can be stored in the data file 128b, is implicitly here.

When a trick mode operation in which playback occurs faster or slower than 1× is specified by the client to the server only a single parameter denoting the speed of playback operation is passed from the client to server. However, the server is free to choose how to present the video frames to the client. Depending on the application, the server can choose a sequence of pictures starting from the beginning of the GOP, and selectively filter frames or repeat frames to achieve the desired result.

When the DMS 120 streams a video program to the DMR 130 the server can pace (step 316) the output of video frames according to a timebase based on the trick mode speed times the real time interval elapsed. That is, the server 120 can provide automatic traffic shaping based on the time-maturity of the video frames during a session. The pacing can be maintained in both trick mode playback as well as in normal mode playback. A simple software-based timer can be used to count time in 45 kHz clock cycles, which provides PTS units that are 32-bits for convenient arithmetic (step 318). In reverse streaming (e.g., for rewind trick mode playback) the server also paces but it paces in the negative direction.

In digital video, all video frames can have a presentation timestamp (PTS) associated with the video frames and used for playing back the video frames at the correct time. In video encoding, the PTS generally can be monotonically increasing for I- and P-frames, but may not be monotonically increasing for B-frames because of the bi-directional interpolation needed for decoding, where reference frames with future timestamps have to be sent first. Thus, when the server 120 streams video program data to the client, I- and P-frames can be used for pacing to the timebase, and to send B-frames, an interpolation between known PTS's can be used to determine the sending time for B-frames, based on how many out of order B-frames are present in the section of the group of pictures (GOP). This effectively constructs a "Streaming Time Stamp" (STS) that is monotonically increasing and equal to the PTS for I- and P-frames, but is interpolated for B-frames. In the 1× (normal mode) streaming case the PCR can be used as a reliable clock source. However, for trick modes the STS can be used. Other clock sources, in addition to the PCR source, can be used for streaming, if the clock source paces time according to the video stream and is monotonically increasing. Thus, the PTS information of packets in the buffer 313 can be compared (step 320) to the pacing timebase 318, and when match occurs the packet can be streamed out of the buffer 313 (step 322) of the DMS 120 over the data connection 112 of the network 110 to the DMR 130 for rendering on the display device 132.

In some implementations, when playing back the video program from the file 128a in a trick mode, it is not necessary to pace the output of the video frames, and trick mode operation without pacing is also contemplated. Without pacing, there is no throttling of the video program data at the application layer. However, if the TCPIP protocol is employed to transfer the program over the network, then the streaming of the video program data is automatically throttled by the client 130, because the client's FIFO buffers would eventually overflow at some point causing packets to be dropped. This would cause retransmissions and would ultimately act to match the streaming rate to the consumption rate at the client. To match the consumption rate to the streaming rate, the client can automatically delay TCP sending acknowledgement packets back to the server when its buffer level becomes greater than a certain depth or high watermark or can drop packets when a critical threshold is reached. Although streaming without pacing is attractive for its simplicity, server-side pacing provides a traffic shaping solution that performs well when streaming to multiple clients, as there is an opportunity to send data to the multiple clients gracefully in a round robin format and to load balance between clients while waiting for the stream timestamps to mature.

To provide smooth playback with little latency when switching between normal and trick modes, the client 130 can send accurate information about the PTS data associated with packets being processed by the decoder 138 or stored in the decoder's buffer back to the server when the client sends a PVR event to the server. This provides a mechanism for the server to seek to the nearest GOP boundary or another appropriate frame and start feeding data to the client so that best continuity or transition is observed at the client's decoded image. In one implementation, the PTS information can be included in the header of a packet sent from the client to the server to indicate a trick mode event. For example, in one implementation, to denote feedback information from the client to the server, in addition to the standard HTTP GET request with a URI, HTTP fields can be used to define the desired playback speed in the requested trick mode and the timestamp within the file at which the server should transition from one mode to another. For example, the header "PlaySpeed.dlna.org: 4" can be used to indicate that the desired playback speed is 4×, and the header "TimeSeekRange.dlna.org: 30.000" can be used to indicated that the server should seek to a position 30 seconds from the beginning of the stream. These parameters minimally provide the necessary application programming interface (API) for server-side trick modes to function. These terms have been defined and used by the Digital Living Network Alliance (DLNA), and are used here to pass parameters back to the server in a standardized way.

The downstream response from the server when starting a normal mode playback can provide several important parameters, that are denoted here in the form BCM-xxxx-yyyy. For example, a sample HTTP response from the server 120 to a client-initiated GET request can typically contain the header fields shown in Table 1 below.

TABLE 1

HTTP/1.1 200 OK
Content-Type: video/mpeg
Date: Sat, 01 Jan 2000 00:05:22 GMT
Connection: keep-alive
BCM-Video-PID: 0x31
BCM-Video-Type: 0x2
BCM-Pcr-PID: 0x34
BCM-Audio-PID: 0x34
BCM-Audio-Type: 0x81
BCM-First-PTS: 0x12344543
x-intel-MediaDuration: 600.0
Accept-Ranges: bytes
Content-Range: bytes 0-12345677/12345678
ContentFeatures.dlna.org:
   DLNA.ORG_PN=MPEG_TS_NTSC;
DLNA_ORG_OP=10;
DLNA_ORG_PS=-64,-32,-16,-8,-4,4,16,32,64"
   Server: Linux/2.x.x, UPnP/1.0, Broadcom UPnP SDK/1.0

The first header field, HTTP/1.1 200 OK, is a standard HTTP response code, where the number "200" indicates a successful response to the GET request. If there is an error, an error code such as "404" for file not found, etc. can be provided by the server. The next field, Content-Type: video/mpeg, denotes that the content type of the video program requested by the URI in the GET request is as video/mpeg MIME type, which ensures proper operation with 3rd party clients such as PCs that are using a standard browser, and will instruct the client to launch the correct type MIME player. The date in the third field is a string denoting the time that the server sent the response. The fourth field, connection keep-alive, is a hint to the client to keep reusing the same connection for further HTTP connections for efficiency.

The next set of fields denoted by BCM-xxx-yyy are newly introduced name value pairs in the HTTP header, which describe hints for the client about how to setup the video decoder for playing back the video program. In the case of a HTTP server, this metadata in the header fields about Video PID, Video Type, Audio PID, Audio Type, PCR PID, and the value of the first PTS can be passed to the client in the HTTP header itself before any data is sent. The media duration is also an important parameter that can be passed, but has been defined by Intel, and we reuse this field definition. The fact that the server sends these additional fields provides an added value to the client, because the client can use this information to gain important knowledge about the video program that will be streamed to it from the server. Per the HTTP protocol, the client is free to ignore these fields if the client does not care about them or does not understand them.

The fields, Accept-Ranges and Content-Range, serve to enable backward compatibility with client-side implementation of trick mode operation, where the client is allowed to request that the server stream from a specific byte in the file. The file, Accept-Ranges:bytes, indicates that the server will accept a request from the client to stream particular bytes of the program, and the field, Content-Range:0-12345677/12345678 indicates the range for the seekability of the current media file, as measured in bytes.

The header field, ContentFeatures.dlna.org, shows several options for describing the trick modes that are supported by the server. The server can use this header field to advertise, for example, that the content is MPEG-TS (i.e., a MPEG transport stream), and the playspeeds supported for this file are the set −64×, −32×, −16×, −8×, −4×, 4×, 16×, 32×, and 64×. The last header field line, Server:option, describes the type of server and the media API's supported by the server from which the video program is streamed to the client.

Figure 4:
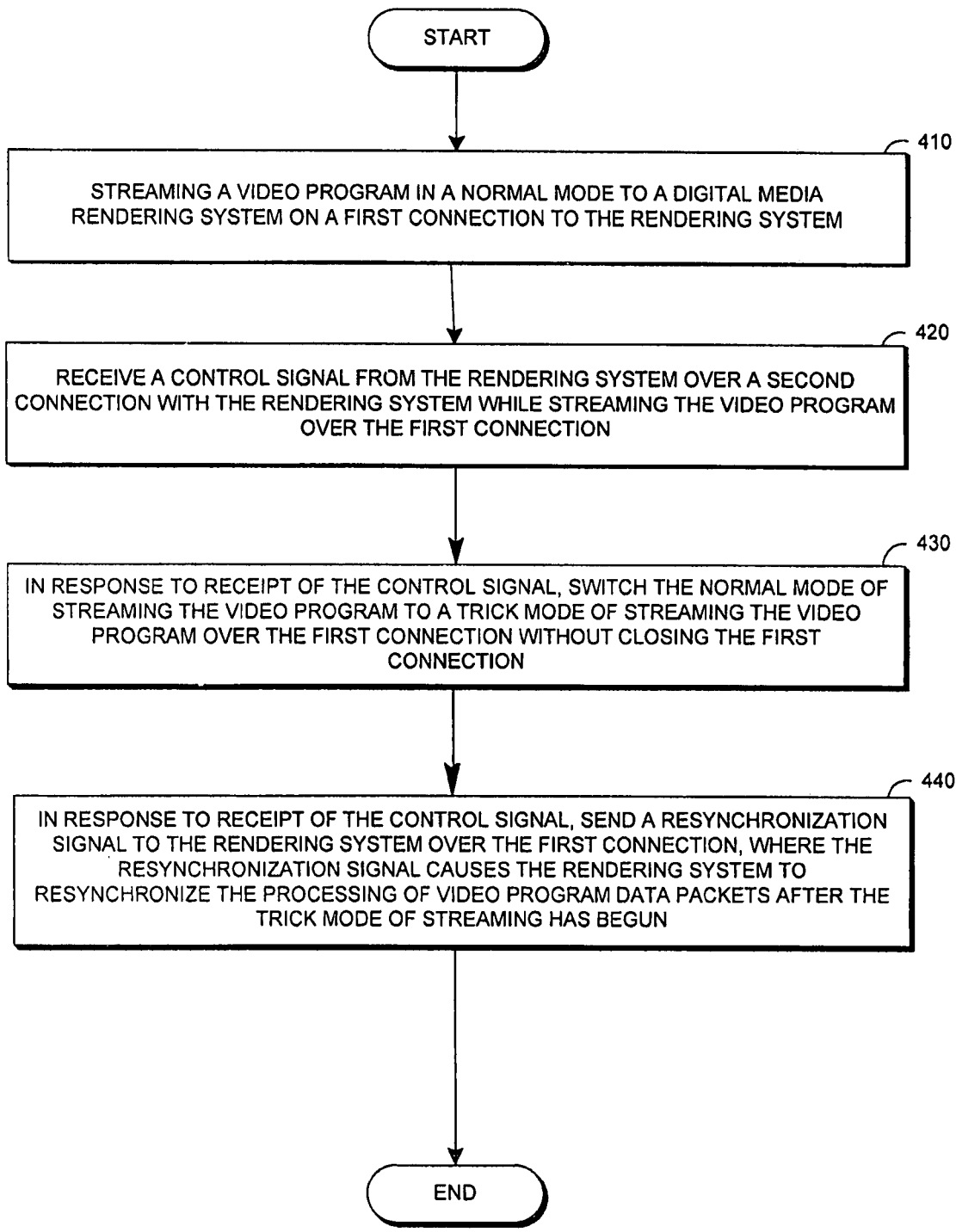
FIG. 4 is a flow chart illustration a process of handling trick mode streaming over a network.

FIG. 4 is a flow chart illustration a process 400 of handling trick mode streaming over a network. After the process starts a video program is streamed in a normal mode to a digital media rendering system on a first connection to the rendering system (step 402). Then, while streaming the video program over the first connection, a control signal is received from the rendering system over a second connection with the rendering system (step 404). In response to receipt of the control signal, the normal mode of streaming the video program is switched to a trick mode of streaming the video program over the first connection (step 404). This is done without closing the first connection. In response to receipt of the control signal, a resynchronization signal is sent to the rendering system over the first connection (step 406). The resynchronization signal causes the rendering system to resynchronize the processing of video program data packets after the trick mode of streaming has begun.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

Many other examples and features may be included that are not necessarily discussed here. For example, although the techniques disclosed here have been described in the context of a TCPIP network protocol, the techniques can be easily adapted for other network protocols such as User Datagram Protocol (UDP), Real-time Transport Protocol (RTP), and Real Time Streaming Protocol (RTSP). The techniques and methods described herein have been described with respect to video-based PVR. However, these techniques also can be applied for audio and other media and data types. Other formats of video can also use these techniques, such as DVD streams. Based on these techniques, PVR capabilities can be provided to any networked media device including wireless and hand-held devices (e.g., cell phones, personal computers, video gaming consoles, and other digital media devices) for PVR-like operation. The techniques described herein can be implemented in systems that include more than one server and a client. In such an implementation, the control commands may come from a controlling station (i.e., a third party), while the server originates the video program data, and the client consumes the data. For example, the controlling station could be a third party personal computer or other controlling user. Thus, a fast switching mechanism can be provided for switching between the video programs originating from the various different servers. One example of such an implementation where this could be used would be during the visualization of video feeds from several video cameras (e.g., in a home or in a building monitoring application), because switching between the video feeds would be quite efficient. The server can have a single high-speed TCP connection open to provide video data-flow, and the actual video signal streamed can be alternated automatically as originating from various different cameras or can be controlled by an out-ofband control connection similar to the PVR control model. NRP packets can be used to denote the beginning of new session or stream after a switch from one camera to another. This is much like a fast channel change implementation.

The techniques described herein also can be applied to a normal digital network video where fast channel changes between different programs within a broadcast are required. Because the connection between the client and the server that offers many different video programs is already established, a new session between the client and the server need not be opened when switching channels and therefore the channel change operation can occur at a high speed because session setup and startup times are negligible.

Thus, while certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method comprising:
streaming video packets from a video program normal mode from a digital media server to a digital media rendering system on a first socket to the rendering system;
receiving, at the digital media server, a control signal from the rendering system over a second socket with the rendering system while streaming the normal mode video packets over the first socket, the second socket being separate from the first socket;
in response to receipt of the control signal, switching from a normal mode of streaming the video program to a trick mode of streaming the video program from the digital media server to the rendering system over the first socket without closing the first socket; and
in response to receipt of the control signal, sending a resynchronization signal from the media server to the rendering system over the first socket, wherein the resynchronization signal denotes a beginning of a trick mode stream of video data, indicates that packets of video data received after the resynchronization signal are trick mode video packets and should be processed by the rendering system, and is adapted to cause the rendering system to resynchronize the processing of video packets, including processing the trick mode video packets, after the trick mode of streaming has begun in the new stream.

2. The method of claim 1, wherein the first socket is an HTTP socket.

3. The method of claim 1, further comprising:
in response to receipt of the control signal, streaming the video program from an earlier time of the program than being streamed when the control signal is received.

4. The method of claim 1, further comprising, when streaming the video program in the trick mode of streaming, pacing the output of frames of the video program according to presentation time stamps associated with the video frames.

5. The method of claim 1, wherein:
the control signal includes a timestamp indicating when the switching from the normal mode to the trick mode should occur; and
the switching from the normal mode to the trick mode includes streaming the video program over the first socket at a position in the video program indicated by the timestamp.

6. The method of claim 1, wherein the control signal includes an HTTP GET request defining a desired playback speed in the trick mode and a timestamp at which the switching from the normal mode to the trick mode should occur.

7. The method of claim 1, further comprising synchronizing, via a semaphore mechanism, a first thread associated with the first socket with a second thread associated with the second socket.

8. The method of claim 1, wherein the control signal includes a binary audio visual packet.

9. A method comprising:
streaming a video program in a normal mode from a digital media server to a digital rendering system via a data connection with the rendering system;
receiving, at the digital media server, a control signal from the rendering system via a control connection which is separate from the data connection, the control signal including a header indicating a desired playback speed and a timestamp at which a switch should occur from the normal mode to a trick mode; and
in response to receipt of the control signal, sending a resynchronization packet from the digital media server to the rendering system, and after sending the resynchronization packet, streaming the video program from the digital media server to the rendering system in the trick mode at the indicated desired playback speed and at the indicated timestamp.

10. The method of claim 9, wherein the control signal is received from a system different from the rendering system.

11. The method of claim 9, wherein the streaming the video program in response to receipt of the control signal includes sending a first timestamp of the video program to the rendering system.

12. A digital media system comprising:
a network interface controller adapted to receive packets of video program data streamed from a digital media server over a first connection and send the packets to a decoder;
a control signal generation engine adapted to:
send a control signal from the digital media system to the digital media server over a second connection that remains open while the first connection is open, the control signal requesting the digital media server to switch the video program from a normal mode to a trick mode;
send a flush packet from the network interface controller to the decoder after sending the control signal to the digital media server, the flush packet instructing the decoder to flush remaining video data and
send a resynchronization packet from the network interface controller to the decoder after receiving a first data packet from the trick mode, the resynchronization packet instructing the decoder to resume decoding video data packets indicating that a trick mode has begun and; and the decoder adapted to:
process and decode packets of a stream of the video program data received from the digital media server and to output the decoded data from the decoder to a display device;
discard packets which were received from the network interface controller after receiving the flush packet from the control signal generation engine and before receiving the resynchronization packet from the control signal generation engine; and resume decoding packets of video program data received from the network interface controller after receiving the resynchronization packet.

13. The system of claim 12, wherein the first connection is an HTTP connection.

14. The system of claim 13 wherein the second connection is an HTTP connection.

15. The system of claim 12, wherein the flush packet is adapted to cause video program data to be flushed from a buffer in the decoder.

16. The system of claim 12, wherein the control signal is adapted to cause video program data to be flushed from a buffer in the streaming system.

17. The system of claim 12, wherein the decoder is adapted for outputting video data but not audio data to the display device when the server streams the video program in a trick mode.

18. The system of claim 12, wherein the first connection and the second connection are wireless connections.

19. The system of claim 12, wherein the control signal generation engine is adapted to generate the control signal for sending to the digital media server over the second connection, the control signal instructing the digital media server to switch from streaming the packets of the video program in a normal mode of streaming to streaming the packets of the video program in a trick mode over the first connection without closing the first connection and to send the resynchronization signal to the rendering system over the first connection.

20. The system of claim 19, wherein the control signal also indicates a desired playback speed.

21. A non-transitory machine-readable storage device comprising a computer program stored thereon that, when executed by at least one processor, is configured to cause a digital media server to:
  stream normal mode video packets from a video program from the digital media server to a digital media rendering system on a first socket to the rendering system;
  receive, at the digital media server, a control signal from the rendering system over a second socket with the rendering system while streaming the normal mode video packets over the first socket, the second socket being separate from the first socket;
  in response to receipt of the control signal, switch from a normal mode of streaming the video program to a trick mode of streaming the video program from the digital media server to the rendering system over the first socket without closing the first socket; and
  in response to receipt of the control signal, send a resynchronization signal from the media server to the rendering system over the first socket, wherein the resynchronization signal denotes a beginning of a trick mode stream of video data, indicates that packets of video data received after the resynchronization signal are trick mode video packets and should be processed by the rendering system, and is adapted to cause the rendering system to resynchronize the processing of video packets, including processing the trick mode video packets, after the trick mode of streaming has begun in the new stream.

22. A non-transitory machine-readable storage device comprising a computer program stored thereon that, when executed by at least one processor, is configured to cause a digital media server to:
  stream a video program in a normal mode from the digital media server to a digital rendering system via a data connection with the rendering system;
  receive, at the digital media server, a control signal from the rendering system via a control connection which is separate from the data connection, the control signal including a header indicating a desired playback speed and a timestamp at which a switch should occur from the normal mode to a trick mode; and
  in response to receipt of the control signal, send a resynchronization packet from the digital media server to the rendering system, and after sending the resynchronization packet, stream the video program from the digital media server to the rendering system in the trick mode at the indicated desired playback speed and at the indicated timestamp.

* * * * *

UNITED STATES PATENT AND TRADEMARK OFFICE
CERTIFICATE OF CORRECTION

PATENT NO.            : 8,356,324 B2
APPLICATION NO.       : 11/859571
DATED                 : January 15, 2013
INVENTOR(S)           : Yasantha Nirmal Rajakarunanayake It is certified that error appears in the above-identified patent and that said Letters Patent is hereby corrected as shown below:

In column 13, line 24-25, In Claim 1, delete "streaming video packets from a video program normal mode from a digital media server" and insert -- streaming normal mode video packets from a video program from a digital media server --, therefor.

In column 14, line 48, In Claim 12, delete "data and" and insert -- data; and --, therefor.

In column 14, line 52-54, In Claim 12, delete "packet instructing the decoder to resume decoding video data packets indicating that a trick mode has begun and; and the decoder adapted to:" and insert -- packet indicating that a trick mode has begun and instructing the decoder to resume decoding video data packets; and the decoder adapted to: --, therefor.

Signed and Sealed this
Second Day of April, 2013

Teresa Stanek Rea
*Acting Director of the United States Patent and Trademark Office*